United States Patent [19]
Kössmeier et al.

[11] Patent Number: 6,145,271
[45] Date of Patent: Nov. 14, 2000

[54] TRANSVERSE BEAM AND METHOD OF MANUFACTURING A TRANSVERSE BEAM

[75] Inventors: Heinz Kössmeier; Meinolf Köthenbürger, both of Delbrück-Boke; Wigbert Christophliemke, Schloss Holte-St, all of Germany

[73] Assignee: Benteler AG, Paderborn, Germany

[21] Appl. No.: 08/987,928

[22] Filed: Dec. 10, 1997

[30] Foreign Application Priority Data

Dec. 21, 1996 [DE] Germany .......................... 196 53 959

[51] Int. Cl.⁷ .................................................. E04C 3/30
[52] U.S. Cl. .................. 52/735.1; 52/731.2; 52/731.6; 52/732.1; 296/188; 296/146.6
[58] Field of Search ............................. 52/731.2, 731.6, 52/735.1, 732.1, 730.4; 296/188, 146.6, 705, 189, 195

[56] References Cited

U.S. PATENT DOCUMENTS

| | | |
|---|---|---|
| 824,550 | 6/1906 | Lazerges . |
| 1,350,544 | 8/1920 | Brown . |
| 3,029,914 | 4/1962 | Macomber . |
| 3,237,362 | 3/1966 | Fromsom . |
| 4,455,806 | 6/1984 | Rice .......................................... 52/732 |
| 4,599,843 | 7/1986 | Ingvarsson ................................. 52/729 |
| 4,919,473 | 4/1990 | Laimighofer et al. ................... 296/188 |
| 5,277,469 | 1/1994 | Klippel ................................... 296/146.6 |
| 5,580,120 | 12/1996 | Nees et al. ............................ 296/146.6 |
| 5,887,938 | 3/1999 | Topker et al. ........................... 296/188 |

FOREIGN PATENT DOCUMENTS 0 752 332   1/1997   European Pat. Off. .

*Primary Examiner*—Carl D. Friedman
*Assistant Examiner*—Yvonne M. Horton
*Attorney, Agent, or Firm*—Friedrich Kueffner

[57] ABSTRACT

A transverse beam forming an at least indirect component of a composite suspension control arm shaft has over a substantial part of its length a trough-shaped torsion portion with a U-shaped or V-shaped cross-section formed by chipless deformation of a tubular hollow section, end portions having a circular cross-section and intermediate portions with a continuously changing cross-section from the end portions to the torsion portion, wherein the double walls of the torsion portion have in the transition areas from the torsion portion to the intermediate portions transversely directed embossments or impressions at the deepest point of the torsion portion, wherein the embossments or impressions engage in each other. Axially formed transverse webs are provided at the transitions from the end portions to the intermediate portions, wherein the transverse webs frontally face the torsion portion, extend essentially radially relative to the longitudinal axis and are formed from the bottom walls of the intermediate portions.

2 Claims, 1 Drawing Sheet

U.S. Patent    Nov. 14, 2000    6,145,271
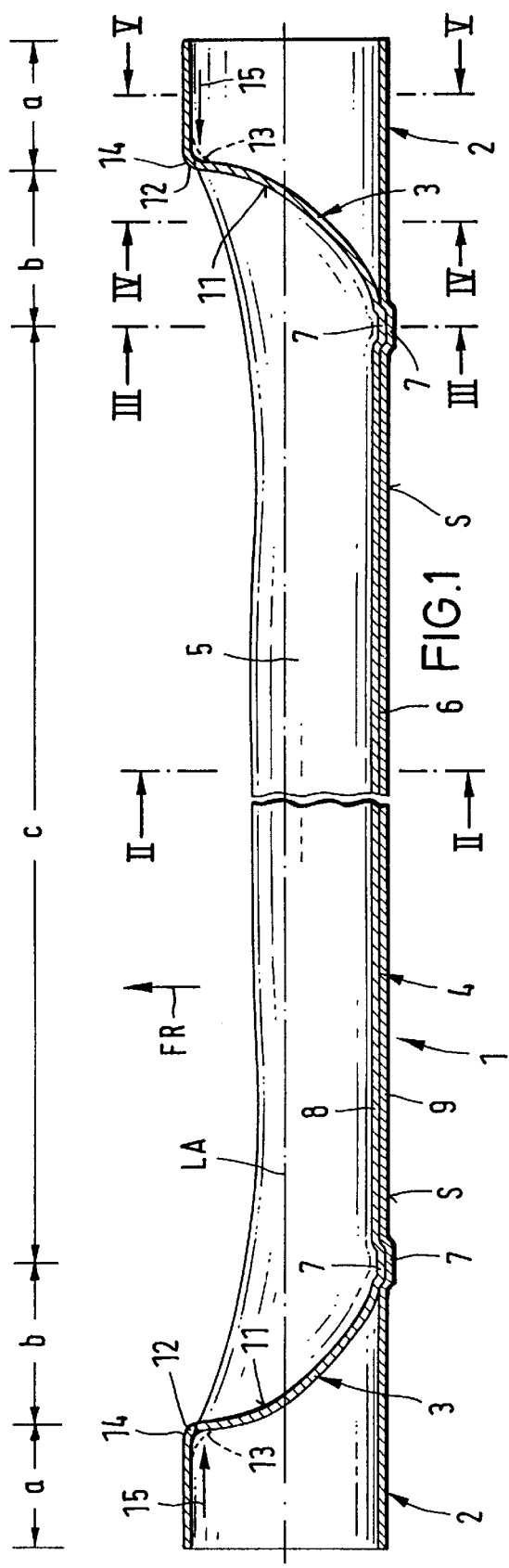

TRANSVERSE BEAM AND METHOD OF MANUFACTURING A TRANSVERSE BEAM

BACKGROUND OF THE INVENTION

1. Field of the Invention

The present invention relates to a transverse beam as an at least indirect component of a composite suspension control arm shaft. The present invention also relates to a method of manufacturing such a transverse beam.

2. Description of the Related Art

EP 0 229 576 B1 discloses a composite control arm shaft manufactured from a pipe, wherein the longitudinal control arms of the control arm shaft extend parallel to each other and are tubular without being deformed. Except for its also circular tubular ends, the transverse beam, which connects the longitudinal control arms in a manner which is stiff with respect to bending but yielding with respect to torsion, has a cross-section which is L-shaped, V-shaped, T-shaped, U-shaped, X-shaped or H-shaped.

In the past, a composite control arm shaft of this type could not be used in actual practice because of problems with respect to the required service life. The reason that a satisfactory service life could not be achieved is in U-shaped and V-shaped transverse beams the high load occurring in the transition areas between the deformed length portion and the non-deformed length portion, so that premature failure occurs in these areas in the case of a continuous use.

In contrast, transverse beams deformed into an X-shape or a Y-shape have a longer service life because the shearing center coincides with the center of gravity of the transverse beam. However, these cross-sections have the disadvantage of a limited possibility of varying the bending stiffness in relation to the weight and the positioning of the shearing center of the transverse beam which is responsible for the running characteristics.

DE 27 35 939 B1 discloses a composite axial system for motor vehicles in which two tubular longitudinal control arms are connected to each other in an angle-stiff manner by a V-shaped transverse rod. The transverse rod is composed of a single layer and has a V-shaped, cross-section over the entire length. In the transition areas from the transverse rod to the longitudinal control arms, separately manufactured, shoe-shaped gusset plates are welded to the transverse rod and to the longitudinal control arms. The transverse rod has embossed corrugations in its apex area in front of the end faces of the gusset plates facing the vertical transverse middle plane of the transverse beam.

In order to construct the transition areas between the deformed length portions and the non-deformed length portions which are subjected to the highest loads in such a way that the occurring stresses are uniformly distributed over the entire section area, European patent application 0 752 332 discloses a transverse control arm which has circular tubular end portions and a torsion portion in the middle formed by chipless deformation of a double-wall U-shaped section, wherein the intermediate portions between the end portions and the torsion portion change continuously from the circular cross-section to the U-shaped cross-section, and wherein the transverse control arm is at the ends of the U-shaped portion and at the arc-shaped web provided with inwardly and outwardly directed embossments with rounded edges.

SUMMARY OF THE INVENTION

Therefore, it is the primary object of the present invention to further develop a transverse beam of the above-described type in such a way that it has a longer service life with an increased free length of the torsion portion.

In accordance with the present invention, a transverse beam forming an at least indirect component of a composite suspension control arm shaft has over a substantial part of its length a torsion portion with a U-shaped or V-shaped cross-section formed by chipless deformation of a tubular hollow section into a trough-like shape with double walls, end portions having a circular cross-section and intermediate portions with a continuously changing cross-section from the end portions to the torsion portion, wherein the walls of the torsion portion have in the transition areas from the torsion portion to the intermediate portions transversely directed embossments or impressions at the deepest point of the torsion portion, wherein the embossments or impressions engage in each other. Axially formed transverse webs are provided at the transitions from the end portions to the intermediate portions, wherein the transverse webs frontally face the torsion portion, extend essentially radially relative to the longitudinal axis and are formed from the bottom walls of the intermediate portions.

By axially forming the transverse webs from the bottom walls of the intermediate portions at the transitions from the circular end portions to the intermediate portions, essentially nose-shaped stiffening portions of the transverse beam are achieved, so that the relative movements between the two U-shaped or V-shaped walls of the torsion portion occurring during the normal axial loads are significantly reduced, and the bending stresses occurring in the intermediate portions are especially reduced.

Moreover, the transverse webs produce radially steeply inclined contours transversely of the section length. This results in the advantage that the intermediate portions between the end portions and the torsion portion can be constructed shorter than in the prior art embodiment, so that the effective length of the torsion portion can be increased. This, in turn, results in a reduction of the rolling rate of the transverse beam.

In addition, the embossments in the transition portions can be essentially shifted from the torsion portion to the intermediate portions without having to change the connecting contours. Consequently, the present invention provides a greater variability of the rolling rate adjustment.

Finally, the transverse webs make it possible to reduce significantly the air gap formed during the manufacture of the embossments as a result of the restoring behavior of the material between the walls of the torsion portion; the air gap can be reduced by 50% to 70%. This significantly improves the mutual locking of the embossments.

The embossment may extend in transverse direction or in longitudinal direction of the transverse beam. Moreover, the embossments can be directed inwardly or outwardly and may especially have rounded edges.

The transverse beam may be a single-piece component of a composite front suspension control arm shaft or may be connected, particularly by welding, to separately manufactured longitudinal control arms which support the wheels.

Generally, it can be stated that the configuration of the transverse beam according to the present invention makes it possible that a transverse beam has a longer service life. Moreover, the defined lengths of the intermediate portions can be better adjusted and the accuracy of the manufacturing dimensions is increased. Finally, the present invention provides the possible variability of the reduction of the effective length of the intermediate portions, so that the free torsion length of the torsion portion can be more freely adjusted.

The method of manufacturing the transverse beam according to the present invention includes deforming by chipless deformation an elongated tubular hollow section over a significant portion of its length into a torsion portion having a U-shaped or V-shaped cross-section, and forming the end portions of the hollow section with a circular cross-section. Transversely directed embossments which engage in each other are provided at the deepest point of the walls of the transition areas from the torsion portion to the intermediate portions which connect the torsion portion to the end portions. Subsequently, essentially radially extending transverse webs are axially formed out of the bottom walls of the intermediate portions at the transitions from the end portions to the intermediate portions, wherein the transverse webs frontally face the torsion portion.

The transverse webs are manufactured especially by using mandrels. After the U-shaped or V-shaped torsion portion is manufactured between the circular end portions, the intermediate portions also initially have over their entire length a trough-shaped structure. By inserting mandrels into the end portions in axial direction, the transverse webs are pressed out of the bottom of the trough-shaped structure in a planar configuration at the transitions from the end portions to the intermediate portions and the steeply inclined nose-like contours of the transverse webs are produced in this manner perpendicularly of the section length.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a horizontal longitudinal sectional view of a transverse beam for a composite suspension control arm shaft;

FIG. 2 is a vertical transverse sectional view of the transverse beam of FIG. 1 taken along sectional line II—II;

FIG. 3 is a vertical transverse sectional view of the transverse beam of FIG. 1 taken along sectional line III—III;

FIG. 4 is a vertical transverse sectional view of the transverse beam of FIG. 1 taken along sectional line IV—IV; and FIG. 5 is a vertical transverse sectional view of the transverse beam of FIG. 1 taken along sectional line V—V.

DESCRIPTION OF THE PREFERRED EMBODIMENTS

FIG. 1 of the drawing shows a transverse beam 1 of a composite suspension control arm shaft, otherwise not illustrated in detail, of a passenger car.

The transverse beam 1 is manufactured from an originally circular pipe whose cross-section is maintained in the end portions 2 over the length a, as illustrated in FIGS. 1 and 5.

The circular cross-section changes continuously over in the intermediate portions 3 having a length b, as shown in FIGS. 1 and 4, by chipless deformation into a U-shaped trough-like double-wall cross-section which extends over the middle torsion portion 4 of the transverse beam 1 having a length c, as shown in FIGS. 1 and 2. The length c is significantly greater than the lengths a and b. The continuous change from the circular cross-section in the end portions 2 into the trough-shaped cross-section in the torsion portion 4 can be clearly seen with the aid of FIGS. 2 to 5.

In FIG. 2, the transverse beam 1 is illustrated in the assembly position in a passenger car. Consequently, the double-wall sides 5 of the torsion portion 4, as shown in FIG. 2, extend slightly diverging in travel direction FR from the arc-shaped web 6 relative to the horizontal middle longitudinal plane MLE extending through the longitudinal axis LA.

As FIGS. 1 and 3 further show, the transverse beam 1 is provided with corrugation-like embossments 7 in the transition portions from the torsion portion to the intermediate portions 3. These embossments 7 formed in the two trough walls 8 and 9 have their greatest depth in the apex S of the torsion portion 4 located in the horizontal middle longitudinal plane MLE. The embossments 7 engage into each other in a centering manner.

In the illustrated embodiment, the embossments 7 are formed against the travel direction FR.

In the torsion portion 4, the walls 8 and 9 are located closely together except for the bent ends 10 shown in FIG. 2; on the other hand, the distance between the walls 8 and 9 increases from the torsion portion 4 in the direction toward the end portions 2, as is apparent from FIGS. 2 to 5.

As additionally illustrated in FIGS. 1 and 4, transverse webs 12 are formed out of the bottom 11 of the wall 8 of the intermediate portions 3 at the transitions from the end portions to the intermediate portions 3, wherein the transverse webs frontally face the torsion portion and extend essentially radially relative to the longitudinal axis LA. The transverse webs 12 are formed after the tubular hollow section is formed into a trough-like shape by inserting mandrels into the end portions 2, not shown, and forming the transverse webs 12 then axially out of the bottom 11 by means of the mandrels.

The configuration of the transverse beam 1 in this area prior to the calibration by means of the mandrels in illustrated in FIG. 1 by broken lines 13. By axially deforming the areas shown in broken lines 13, essentially stiffening noses 14 are produced at the transverse webs 12. The direction in which the mandrels act is illustrated by arrows 15.

While specific embodiments of the invention have been shown and described in detail to illustrate the inventive principles, it will be understood that the invention may be embodied otherwise without departing from such principles.

We claim:

1. A transverse beam configured as an at least indirect component of a composite suspension control arm shaft, the transverse beam comprising a torsion portion extending over a substantial part of a length of the transverse beam, the torsion portion having a U-shaped or V-shaped cross-section in a transverse direction formed by chipless deformation of a tubular hollow section into a trough-like shape with double walls extending continuously over a length of the torsion portion, the transverse beam further comprising end portions having a circular cross-section and intermediate portions between the end portions and the torsion portion, the intermediate portions having cross-sections continuously changing from the end portions to the torsion portion, wherein each wall of the torsion portion has in transition areas from the torsion portion to the intermediate portions transversely directed embossments at a deepest point of the trough-shaped torsion portion, wherein the embossments of the walls engage in each other, further comprising transverse webs axially formed from walls of the intermediate portions and located at transitions from the end portions to the intermediate portions, wherein the transverse webs are located so as to face the torsion portion and extend essentially radially relative to a longitudinal axis of the transverse beam.

2. A method of manufacturing a transverse beam configured as an at least indirect component of a composite suspension control arm shaft, the method comprising deforming by chipless deformation an elongated tubular hollow section over a significant portion of a length of the transverse beam into a torsion portion having a trough-like shape with a U-shaped or V-shaped cross-section in a transverse direction with double walls, forming end portions of the hollow section with a circular cross-section, providing transversely directed embossments at a deepest point of the trough in walls of transition areas from the torsion portion to intermediate portions which connect the torsion portion to the end portions, wherein the embossments of the two walls engage in each other, and axially forming essentially radially extending transverse webs out of bottom walls of the intermediate portions at transitions from the end portions to the intermediate portions, wherein the transverse webs are located so as to face the torsion portion.

\* \* \* \* \*